United States Patent
Khandwavala et al.

(10) Patent No.: US 9,527,736 B2
(45) Date of Patent: Dec. 27, 2016

(54) SYSTEM AND METHOD FOR GENERATING NITROGEN FROM A GAS TURBINE

(71) Applicant: General Electric Company, Schenectady, NY (US)

(72) Inventors: Hatim Anwarhusan Khandwavala, Bangalore (IN); Douglas Scott Byrd, Greer, SC (US); Brian Michael Gallagher, Simpsonville, SC (US); Durgaprasad Janapaneedi, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 727 days.

(21) Appl. No.: 13/851,891

(22) Filed: Mar. 27, 2013

(65) Prior Publication Data
US 2014/0290260 A1 Oct. 2, 2014

(51) Int. Cl.
*B01D 53/22* (2006.01)
*C01B 21/04* (2006.01)
*F02C 6/08* (2006.01)

(52) U.S. Cl.
CPC .............. *C01B 21/0438* (2013.01); *F02C 6/08* (2013.01); *F05D 2270/082* (2013.01)

(58) Field of Classification Search
CPC ............... F01D 25/30; F02C 3/34; F02C 1/00; F02C 1/02; F02C 1/08; F02C 1/10; F02C 7/00; C01B 21/0438; C01B 2203/0405; B01D 53/22; B01D 53/228; B01D 53/268; Y02C 10/10

USPC .......................................... 96/4–14; 95/47–56
See application file for complete search history.

(56) References Cited

U.S. PATENT DOCUMENTS

| | | | |
|---|---|---|---|
| 5,266,101 A | 11/1993 | Barbe | |
| 5,284,506 A | 2/1994 | Barbe | |
| 5,439,507 A | 8/1995 | Barbe et al. | |
| 5,584,194 A * | 12/1996 | Gardner | C01B 23/0094 62/615 |
| 5,802,875 A * | 9/1998 | Drnevich | F02C 3/30 62/656 |
| 6,085,512 A * | 7/2000 | Agee | C01B 3/382 60/39.12 |

(Continued)

FOREIGN PATENT DOCUMENTS

EP 0585158 A1 2/1994

*Primary Examiner* — Craig Kim
(74) *Attorney, Agent, or Firm* — Fletcher Yoder, P.C.

(57) ABSTRACT

A system includes a gas turbine. The gas turbine includes a first compressor configured to provide a first portion of a discharge air to a combustor. The gas turbine also includes the combustor configured to combust a mixture of the first portion of the discharge air and fuel to generate an exhaust gas and to provide the exhaust gas to a turbine. The gas turbine also includes an exhaust outlet coupled to the turbine and configured to enable the exhaust gas to exit the gas turbine. The system also includes a nitrogen purification system coupled to the gas turbine. The nitrogen purification system includes a membrane nitrogen generator configured to receive a second portion of the discharge air from the compressor or a portion of the exhaust gas from the exhaust outlet, wherein the membrane nitrogen generator is configured to generate nitrogen from the second portion of the discharge air or the portion of the exhaust gas.

7 Claims, 5 Drawing Sheets (56) References Cited

U.S. PATENT DOCUMENTS

| | | | | |
|---|---|---|---|---|
| 6,148,602 A | * | 11/2000 | Demetri | F01K 23/068 60/39.12 |
| 2002/0023423 A1 | * | 2/2002 | Viteri | F01K 21/047 60/772 |
| 2003/0136147 A1 | * | 7/2003 | Brugerolle | F25J 3/04018 62/650 |
| 2006/0112696 A1 | * | 6/2006 | Lynghjem | B01D 53/62 60/772 |
| 2007/0034171 A1 | * | 2/2007 | Griffin | F01K 21/047 122/479.1 |

* cited by examiner

SYSTEM AND METHOD FOR GENERATING NITROGEN FROM A GAS TURBINE

BACKGROUND OF THE INVENTION

The subject matter disclosed herein relates to gas turbine engines and, in particular, generating nitrogen from gas turbine engines.

A gas turbine-based power plant may utilize nitrogen in a variety of applications. For example, the power plant may utilize nitrogen to protect against corrosion in equipment or to enable fast start purge credit applications. Typically, nitrogen may be purchased off-site and/or transported on-site to the power plant. However, the power plant may include on-site resources (e.g., resources that are typically wasted) that may be utilized to generate nitrogen. Thus, there is a need to utilize these wasted resources to generate nitrogen and to operate the power plant in a more cost effective manner.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a gas turbine. The gas turbine includes a first compressor configured to provide a first portion of a discharge air to a combustor. The gas turbine also includes the combustor configured to combust a mixture of the first portion of the discharge air and fuel to generate an exhaust gas and to provide the exhaust gas to a turbine. The gas turbine also includes an exhaust outlet coupled to the turbine and configured to enable the exhaust gas to exit the gas turbine. The system also includes a nitrogen purification system coupled to the gas turbine. The nitrogen purification system includes a membrane nitrogen generator configured to receive a second portion of the discharge air from the compressor or a portion of the exhaust gas from the exhaust outlet, wherein the membrane nitrogen generator is configured to generate nitrogen from the second portion of the discharge air or the portion of the exhaust gas.

In accordance with a second embodiment, a system includes a nitrogen purification system configured to couple to a gas turbine. The nitrogen purification system includes a membrane nitrogen generator configured to receive a portion of a discharge air from a compressor of the gas turbine or a portion of an exhaust gas from an exhaust outlet of the gas turbine, and the membrane nitrogen generator is configured to generate nitrogen from the portion of the discharge air or the portion of the exhaust gas.

In accordance with a third embodiment, a method for generating nitrogen from a gas turbine is provided. The method includes routing a portion of a discharge air from a compressor of the gas turbine or a portion of an exhaust gas from an exhaust outlet of the gas turbine to a membrane nitrogen generator. The method also includes generating nitrogen, via the membrane nitrogen generator, from the portion of the discharge air or the portion of the exhaust gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for generating nitrogen from a gas turbine system (e.g., gas turbine engine). A gas turbine includes a compressor to provide a portion of discharge air to a combustor, which then combusts a mixture of the discharge air and fuel to generate an exhaust gas (e.g., combustion gas) that flows to a turbine. The gas turbine further includes an exhaust outlet that enables the exit of the exhaust gas from the turbine. A nitrogen purification system includes a membrane nitrogen generator to generate nitrogen. In particular, the membrane nitrogen generator receives, as a source, another portion of the discharge air from the combustor or a portion of the exhaust gas to generate nitrogen. In certain embodiments, the nitrogen purification system may mix the discharge air portion and exhaust gas portion upstream of the membrane nitrogen generator to generate a discharge air-exhaust gas mixture as the source used by the membrane nitrogen generator to generate nitrogen. For example, the nitrogen purification system may include a controller configured to adjust a ratio of the discharge air portion to the exhaust gas portion (e.g., for mixing) provided to the membrane nitrogen generator. Although the present disclosure utilizes exhaust gas from a gas turbine engine as a source, exhaust gas from other sources (e.g., a reciprocating engine or other combustion equipment such as a furnace, a boiler, etc.) may be utilized.

In certain embodiments, the nitrogen purification system includes a heat exchanger located upstream of the membrane nitrogen generator for controlling the temperature (e.g., cooling) of the discharge air portion, exhaust gas portion, or a mixture of both. In some embodiments (e.g., for generating nitrogen from the exhaust gas portion), the nitrogen purification system includes a blower located upstream of the heat exchanger that directs the exhaust gas portion to the heat exchanger, and an additional compressor (separate from the gas turbine compressor) located downstream of the heat exchanger and upstream of the membrane nitrogen generator that increases a pressure of the exhaust gas portion and directs the pressurized exhaust gas portion to the membrane nitrogen generator. In other embodiments (e.g., for generating nitrogen from the exhaust gas portion), the nitrogen purification system includes an injector located downstream of the heat exchanger and upstream of the membrane nitrogen generator that directs the exhaust gas portion to the membrane nitrogen generator. The nitrogen purification system may divert the generated nitrogen to a power plant (or its components) for immediate use or to a storage tank for future use in the power plant during a gas turbine system shutdown. By using the compressor discharge air portion and/or exhaust gas portion as a source (a source that normally would otherwise be wasted) for nitrogen (e.g., via the nitrogen purification system), the gas turbine-based power plant is able in a cost effective manner to generate nitrogen on-site without having to purchase and/or provide nitrogen from off-site.

Figure 1:
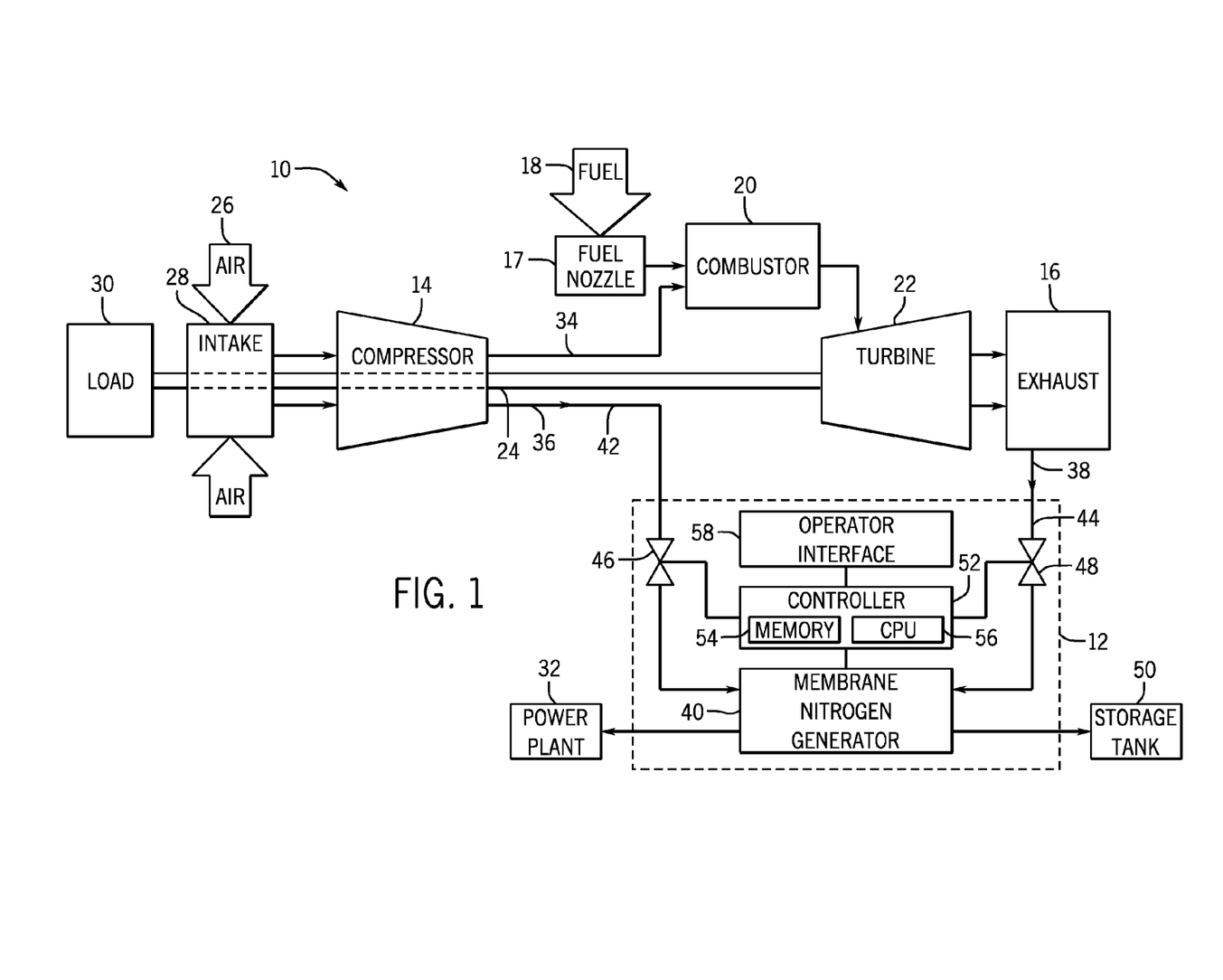
FIG. 1 is a block diagram of an embodiment of a turbine system coupled to a nitrogen purification system.

FIG. 1 is a block diagram of an embodiment of a turbine system 10 (e.g., gas turbine engine) coupled to a nitrogen purification system 12. As described in detail below, the disclosed nitrogen purification system 12 may utilize discharge air from a compressor 14 and/or exhaust gas from an exhaust outlet 16 of the turbine system 10. The turbine system 10 may use liquid or gas fuel, such as natural gas and/or a hydrogen rich synthetic gas, to drive the turbine system 10. As depicted, fuel nozzles 17 intake a fuel supply 18, mix the fuel with air, and distribute the fuel-air mixture into a combustor 20 in a suitable ratio for optimal combustion, emissions, fuel consumption, and power output. The turbine system 10 may include one or more fuel nozzles 17 located inside one or more combustors 20. The fuel-air mixture combusts in a chamber within the combustor 20, thereby creating hot pressurized exhaust gases. The combustor 20 directs the exhaust gases through a turbine 22 toward the exhaust outlet 16 coupled to the turbine 22. As the exhaust gases pass through the turbine 22, the gases force turbine blades to rotate a shaft 24 along an axis of the turbine system 10. As illustrated, the shaft 24 may be connected to various components of the turbine system 10, including the compressor 14. The compressor 14 also includes blades coupled to the shaft 24. As the shaft 24 rotates, the blades within the compressor 14 also rotate, thereby compressing air 26 from an air intake 28 through the compressor 14 and into the fuel nozzles 17 and/or combustor 20. The shaft 24 may also be connected to a load 30, which may be a stationary load, such as an electrical generator in a power plant 32, for example. The load 30 may include any suitable device capable of being powered by the rotational output of the turbine system 10.

As described above, the compressor 14 receives air 26 from the air intake 28, compresses the air 26, and produces a flow of pressurized air 34 (e.g., first compressor discharge air portion) for use in the combustion process within the turbine combustor 20. In addition, the compressor 14 produces another flow of pressurized air 36 (e.g., second compressor discharge air portion) for use by the nitrogen purification system 12 in generating nitrogen. Also, as depicted, a portion of the exhaust gases 38 (e.g., combustion gases) may also be used by the nitrogen purification system 12 in generating nitrogen.

The nitrogen purification system 12 includes a membrane nitrogen generator 40 for generating nitrogen. The membrane nitrogen generator 40 may include any suitable membrane nitrogen generator 40. The membrane nitrogen generator 40 may include one or more membrane cartridges that each structurally includes a hollow-fiber membrane that forms a cylindrical cartridge that acts as a spool with specifically reeled polymer fibers. The membrane nitrogen generator 40 utilizes permeation (i.e., the differential velocity with which various gas mixture components permeate the membrane) to separate or generate nitrogen from a fluid flow (e.g., exhaust gases and/or discharge air). The driver of the gas separation process is the difference in partial pressures on the different sides of the membrane. For example, an external membrane surface may include a partial pressure different from an internal membrane surface. The rate of permeation varies between different gases. Thus, faster molecules, such as moisture and/or $CO_2$, permeate first through the wall of the membrane and may be vented to the atmosphere, while pure nitrogen may come out of the main stream of the purified flow. In certain embodiments, the purity of the nitrogen obtained via the nitrogen purification system 12 (e.g., membrane nitrogen generator 40) may range from approximately 90 to 100, 90 to 95, 95 to 100, or 93 to 97 percent by volume, and all subranges therebetween. For example, the purity of the nitrogen may be 90, 95, 99, 99.5, 99.9, 99.99, or 100 percent by volume, or any other percent. In certain embodiments, the purity of the nitrogen obtained from the nitrogen purification system 12 may be modified based on the downstream application for the nitrogen.

The compressor discharge air portion 36, exhaust gas portion 38, or a mixture of the discharge air portion 36 and exhaust gas portion 38 (e.g., discharge air-exhaust gas mixture) may serve as the source for the membrane nitrogen generator 40 in generating nitrogen. The discharge air portion 36 may include higher amounts of nitrogen than the exhaust gas portion 38 and, thus, the discharge air portion 36 may yield higher amounts of purified nitrogen during nitrogen purification via the nitrogen purification system 12. The discharge air portion 36 is provided to the membrane nitrogen generator 40 via discharge air path 42, while the exhaust gas portion 38 is provided to the membrane nitrogen generator 40 via exhaust gas path 44. The nitrogen purification system 12 may include both of the paths 42, 44. Alternatively, the nitrogen purification system 12 may include only the discharge air path 42 or only the exhaust gas path 44. Although as depicted, the discharge air path 42 and the exhaust gas path 44 both flow directly to the membrane nitrogen generator 40, additional components may disposed along the paths 42, 44. For example, in certain embodiments, a heat exchanger, an additional compressor separate from compressor 14, a blower, and/or injector (e.g., exhaust gas injector) may be disposed along the paths 42, 44 upstream of the membrane nitrogen generator 40. In addition, in certain embodiments, the paths 42, 44 may merge (e.g., in a mixing region) upstream of the membrane nitrogen generator 40 to enable mixing of the discharge air portion 36 and the exhaust gas portion 38 to generate a discharge air-exhaust gas mixture that is provided to the membrane nitrogen generator 40. The discharge air path 42 includes a valve 46 to regulate the flow (e.g., amount of discharge air portion) of the discharge air portion 36 to the membrane nitrogen generator 40. The exhaust gas path 44 includes a valve 48 to regulate the flow (e.g., amount of exhaust gas portion) of the exhaust gas portion 38 to the membrane nitrogen generator 40. In certain embodiments, the valves 46, 48 may include non-return valves, one-way valves, or check valves to block the flow of the discharge air portion 36 and exhaust gas portion 38, respectively, back to the gas turbine system 10, while enabling flow of the portions 36, 38 to the membrane nitrogen generator 40.

Upon purification or generation of the nitrogen, the nitrogen may be immediately diverted, via the nitrogen purification system 12, for use in various applications of the power plant 32 (e.g., protect against corrosion in power plant equipment, fast start purge credit applications, purging fuel lines of the gas turbine system 10 or a gasifier, as a diluent for a combustion reaction in the gas turbine system 10 or a gasifier, as a coolant for machinery, etc.). Alternatively, the nitrogen purification system 12 may divert the purified nitrogen to a storage tank 50 for later use (e.g., during shutdown of the gas turbine system 10).

Presently contemplated embodiments of the membrane purification system 12 include a controller 52 coupled to the components of the system 12. The controller 52 may be coupled to the valves 46, 48 to control the valves 46, 48 and, thus, the flow (e.g., amount) of the discharge air portion 36 and exhaust gas portion 38, respectively, provided to the membrane nitrogen generator 40. For example, the controller 58 may control the valves 46, 48 via actuators coupled to the valves 46, 48 (e.g., electric actuators, hydraulic actuators, pneumatic actuators, etc.). In certain embodiments, the controller 52 may be configured to adjust a ratio or percentage of the discharge air portion 36 to the exhaust gas portion 38, when the discharge air-exhaust gas mixture is provided to the membrane nitrogen generator 40. In certain embodiments, the ratio of discharge air portion 36 to exhaust gas portion 38 may be approximately 100:1, 50:1, 25:1, 10:1, 5:1, 2:1, 1:1, 1:5, 1:10, 1:25, 1:50, or 1:100, any ranges among these specific ratios, or any other ratio. In certain embodiments, the percentage of the discharge air portion 36 used as the source (e.g., as the sole source or as part of the discharge air-exhaust gas mixture) for generating nitrogen via the nitrogen purification system 12 may be approximately 100, 90, 80, 70, 60, 50, 40, 30, 20, 10, or 0 percent by volume, any ranges between these specific percentages, or any other percent of the total source. In certain embodiments, the percentage of the exhaust gas portion 38 used as the source (e.g., as the sole source or as part of the discharge air-exhaust gas mixture) may be approximately 100, 90, 80, 70, 60, 50, 40, 30, 20, 10, or 0 percent by volume, any ranges between these specific percentages, or any other percent of the total source. By regulating the flow of the discharge air portion 36, exhaust gas portion 38, and/or discharge air-exhaust gas mixture provided to the membrane nitrogen generator 40, the controller 52 may regulate the purity of the nitrogen generated via the membrane nitrogen generator 40.

The controller 52 may also be coupled to the membrane nitrogen generator 40 to control operation of the generator 40. In certain embodiments, the controller 52 may be coupled to other components of the nitrogen purification system 12. For example, the controller 52 may be coupled to and control the operation of a heat exchanger, compressor, blower, and/or injector disposed along paths 42, 44. The controller 52 may control or regulate any drives, actuators, valves, or any other components of the heat exchanger, compressor, blower, injector, or membrane nitrogen generator 40. In certain embodiments, the controller 52 may include a memory 54 to store instructions (e.g., code) and a processor 56 configured to process the instructions. The controller 52 may include an operator interface 58 configured to receive operator input.

Figure 2:
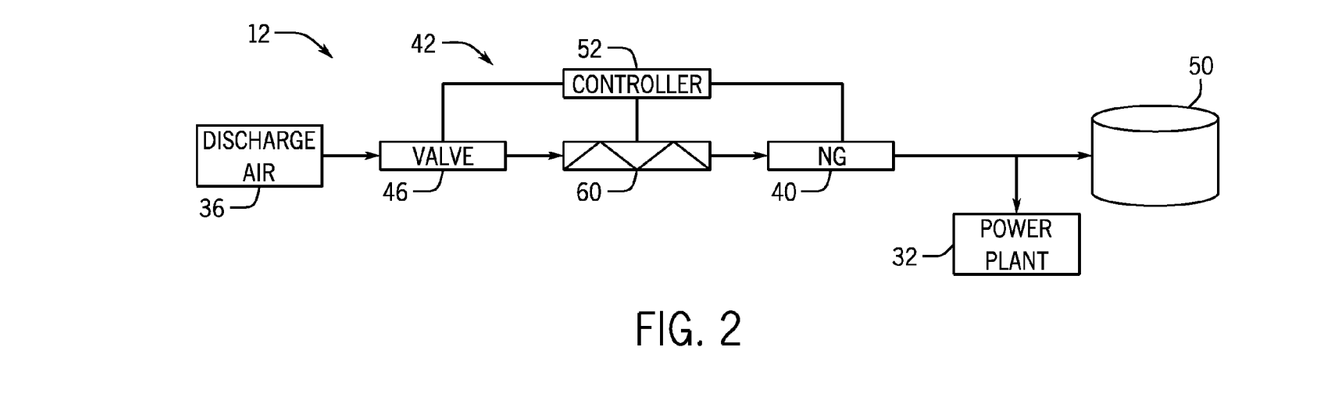
FIG. 2 is a block diagram of an embodiment of the nitrogen purification system of FIG. 1 (e.g., compressor discharge air path)
Figure 3:
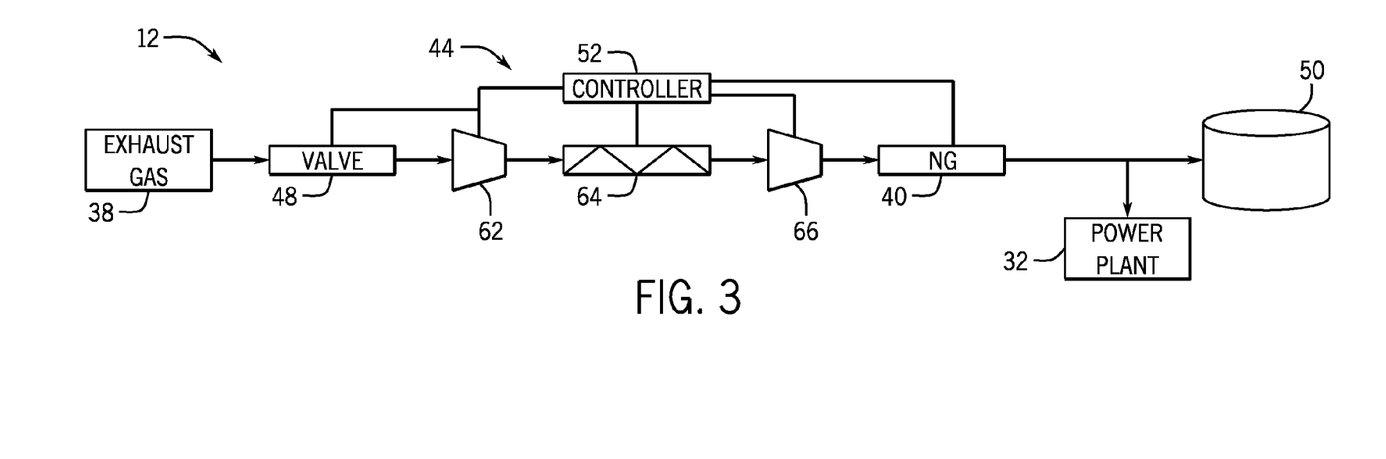
FIG. 3 is a block diagram of an embodiment of the nitrogen purification system of FIG. 1 (e.g., gas turbine exhaust gas path with blower and compressor)
Figure 4:
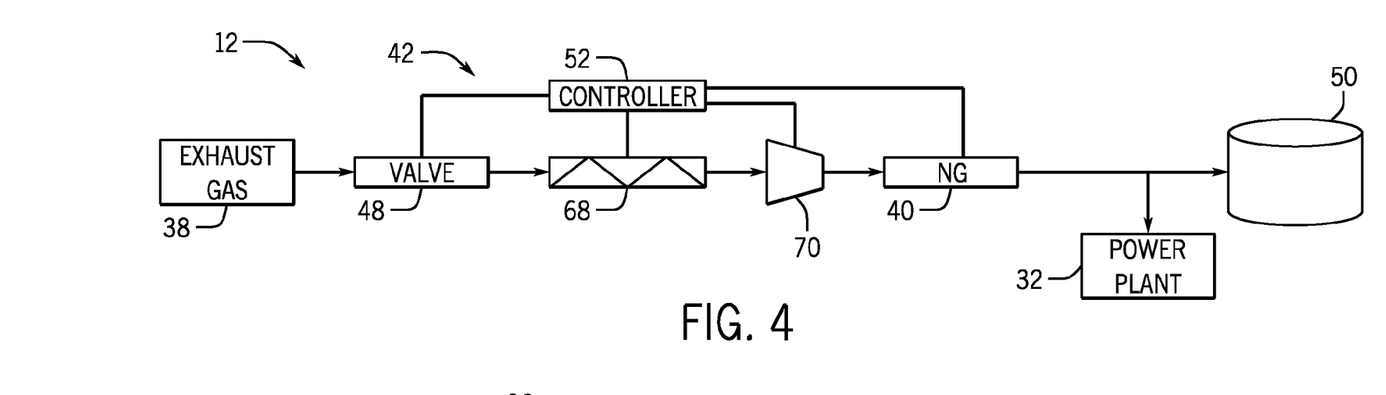
FIG. 4 is a block diagram of an embodiment of the nitrogen purification system of FIG. 1 (e.g., gas turbine exhaust gas path with injector)

FIGS. 2-4 illustrate various configurations of the paths 42, 44 between the turbine system 10 and the nitrogen purification system 12. As mentioned above, the nitrogen purification system 12 may include only one of or both of the paths 42, 44. Also, the nitrogen purification system 12 may include paths 42, 44 merging upstream of the membrane nitrogen generator 40 to enable the mixing of the discharge air portion 36 and the exhaust gas portion 38. FIG. 2 is a block diagram of the nitrogen purification system 12 of FIG. 1 for the discharge air path 42. The discharge air path 42 includes the valve 46, a heat exchanger 60, and the membrane nitrogen generator 40 ("NG"). The valve 46 is disposed along the path 42 downstream of the gas turbine system 10 (e.g., compressor 14) and upstream of the heat exchanger 60. The heat exchanger 60 is disposed along the path 42 downstream of the valve 46 and upstream of the membrane nitrogen generator 40.

The discharge air portion 36 flows through the valve 46. As mentioned above, the valve 46 may include a non-return valve, one-way valve, or check valve to enable flow of the discharge air portion 36 through the valve 46 and towards the membrane nitrogen generator 40, while blocking flow of the discharge air portion 36 back towards the gas turbine system 10 (e.g., compressor 14). After passing through the valve 46, the discharge air portion 36 flows through the heat exchanger 60. The discharge air portion 36 may include sufficient pressure and/or velocity to move along the discharge air path 42 without the need of a compressor (separate from compressor 14), blower, or injector. The heat exchanger 60 cools the discharge air portion 36 to avoid thermal stress or wear on components of the membrane nitrogen generator 40. For example, the heat exchanger 60 may cool the discharge air portion 36 to between approximately 65.6° C. (150° F.) to 148.9° C. (300° F.), 79.4° C. (175° F.) to 135° C. (275° F.), 93.3° C. (200° F.) to 121.1° C. (250° F.), and all subranges therebetween. In certain embodiments, the heat exchanger 60 cools the discharge air portion 36 to or less than approximately 148.9° C. (300° F.). The heat exchanger 60 may include a direct heat exchanger, indirect heat exchanger, coolers, electric heater, a shell and tube heat exchanger, plate heat exchanger, plate and shell heat exchanger, plate fin heat exchanger, or any other type of heat exchanger able to withstand the temperatures of the discharge air portion 36 and the exhaust gas portion 38. In certain embodiments, the heat exchanger 60 may form a circuit or loop that includes one more valves, a pump, a source, and/or actuators associated with the valves, the pump, and/or the source. The source could be any source for a coolant from a component of the power plant 32 (e.g., water tower). In certain embodiments, if the heat exchanger 60 includes an indirect heat exchanger, the heat exchanger 60 may include a first medium that is cooled and then flows through tubes in the path of a second medium (e.g., air or exhaust) to transfer heat from the second medium to the first medium. As mentioned above, the controller 52 is coupled to and controls the valve 46 (e.g., via actuators as described above) and the membrane nitrogen generator 40. For example, the controller 52, via valve 46, may control the amount of discharge air portion 36 provided to the membrane nitrogen generator 40. In certain embodiments, the controller 52 may be coupled to the heat exchanger 60 to control the operation of the heat exchanger 60 (e.g., temperatures of components of the heat exchanger 60). For example, the controller 52 may be coupled to actuators associated with valves, a pump, a source, and/or any other component of the heat exchanger 60.

From the heat exchanger 60, the cooled discharge air portion 36 flows to the nitrogen generator 40. The membrane nitrogen generator 40 generates nitrogen from the discharge air portion 36. From the membrane nitrogen generator 40, as mentioned above, the nitrogen is either immediately diverted for use in applications of the power plant 32 or diverted to the storage tank 50 for later use. As a result, the nitrogen purification system 12 may provide an on-site source (e.g., discharge air portion 36 from the compressor 14 of the gas turbine system 10) of nitrogen for the gas turbine-based power plant 32 (or its components) without having to purchase and/or transport nitrogen from off-site. Thus, the nitrogen purification system 12 may reduce the costs associated with operating the power plant 32.

FIG. 3 is a block diagram of the nitrogen purification system 12 of FIG. 1 for the exhaust gas path 44. The exhaust gas path 44 includes the valve 48, a blower 62 (e.g., centrifugal fan or motorized blower), a heat exchanger 64, a compressor 66 (separate from compressor 14), and the membrane nitrogen generator 40 ("NG"). The valve 48 is disposed along the path 44 downstream of the gas turbine system 10 (e.g., exhaust outlet 16) and upstream of the blower 62 and the heat exchanger 64. The heat exchanger 60 is disposed along the path 44 between the blower 62 and the compressor 66. The compressor 66 is disposed along the path 44 upstream of the membrane nitrogen generator 40.

The exhaust gas portion 38 flows through the valve 48. As mentioned above, the valve 48 may include a non-return valve, one-way valve, or check valve to enable flow of the exhaust gas portion 38 through the valve 48 and towards the blower 62, while blocking flow of the exchange gas portion 38 back towards the gas turbine system 10 (e.g., exhaust outlet 16). The exhaust gas portion 38 may lack sufficient pressure and/or velocity to efficiently flow through the heat exchanger 64. Therefore, after passing through the valve 48, the blower 62 directs or pushes the exhaust gas portion 38 (increasing its pressure and/or velocity) toward and through the heat exchanger 64. The heat exchanger 64 cools the exhaust gas portion 38 to avoid thermal stress or wear on components of the membrane nitrogen generator 40. For example, the heat exchanger 64 may cool the exhaust gas portion 38 to between approximately 65.6° C. (150° F.) to 148.9° C. (300° F.), 79.4° C. (175° F.) to 135° C. (275° F.), 93.3° C. (200° F.) to 121.1° C. (250° F.), and all subranges therebetween. In certain embodiments, the heat exchanger 64 cools the exhaust gas portion 38 to or less than approximately 148.9° C. (300° F.). The heat exchanger 64 may be as described in FIG. 2. From the heat exchanger 64, the cooled exhaust gas portion 38 flows into the compressor 66, which pressurizes the exhaust gas portion 38. In certain embodiments, the compressor 66 may include a reciprocating compressor or a rotary compressor (e.g., 1, 2, 3, 4, 5, or more stage compressor).

As mentioned above, the controller 52 is coupled to and controls the valve 46 (e.g., via actuators as described above) and the membrane nitrogen generator 40. For example, the controller 52, via valve 48 (e.g., via actuators as described above), may control the amount of exhaust gas portion 38 provided to the membrane nitrogen generator 40. In certain embodiments, the controller 52 may be coupled to the heat exchanger 64 (e.g., via actuators coupled to valves, a pump, a source, and/or any other component of the heat exchanger 64) to control the operation of the heat exchanger 64 (e.g., temperatures of components of the heat exchanger 64). In addition, the controller 52 may be coupled to the blower 62 and compressor 66 to control their operation. In particular, the controller 52 may be coupled to drives, motors, or any other components of the blower 62 and/or compressor 66. For example, the controller 52 may control the blower 62 to regulate the velocity imparted to the exhaust gas portion 38. The controller 52 may also control the compressor 66 to regulate how much the exhaust gas portion 38 is pressurized.

From the compressor 66, the pressurized exhaust gas portion 38 flows to the nitrogen generator 40. The membrane nitrogen generator 40 generates nitrogen from the exhaust gas portion 38. From the membrane nitrogen generator 40, as mentioned above, the nitrogen is either immediately diverted for use in applications of the power plant 32 or diverted to the storage tank 50 for later use. As a result, the nitrogen purification system 12 may provide an on-site source (e.g., exhaust gas portion 38 from the exhaust outlet 16 of the gas turbine system 10) of nitrogen for the gas turbine-based power plant 32 (or its components) without having to purchase and/or transport nitrogen from off-site. Thus, the nitrogen purification system 12 may reduce the costs associated with operating the power plant 32.

FIG. 4 is another block diagram of the nitrogen purification system 12 of FIG. 1 for the exhaust gas path 44. The exhaust gas path 44 includes the valve 48, a heat exchanger 68, an injector 70 (e.g., exhaust gas injector), and the membrane nitrogen generator 40 ("NG"). The valve 48 is disposed along the path 44 downstream of the gas turbine system 10 (e.g., exhaust outlet 16) and upstream of the heat exchanger 68. The heat exchanger 68 is disposed along the path 44 between the valve 48 and the injector 70. The injector 70 is disposed along the path 44 upstream of the membrane nitrogen generator 40.

The exhaust gas portion 38 flows through the valve 48. As mentioned above, the valve 48 may include a non-return valve, one-way valve, or check valve to enable flow of the exhaust gas portion 38 through the valve 48 and towards the heat exchanger 68, while blocking flow of the exchange gas portion 38 back towards the gas turbine system 10 (e.g., exhaust outlet 16). The heat exchanger 68 cools the exhaust gas portion 38 to avoid thermal stress or wear on components of the membrane nitrogen generator 40. For example, the heat exchanger 68 may cool the exhaust gas portion 38 to between approximately 65.6° C. (150° F.) to 148.9° C. (300° F.), 79.4° C. (175° F.) to 135° C. (275° F.), 93.3° C. (200° F.) to 121.1° C. (250° F.), and all subranges therebetween. In certain embodiments, the heat exchanger 68 cools the exhaust gas portion 38 to or less than approximately 148.9° C. (300° F.). The heat exchanger 68 may be as described in FIG. 2. The exhaust gas portion 38 may lack sufficient pressure and/or velocity to efficiently flow from the heat exchanger 68 to the membrane nitrogen generator 40. Therefore, after passing through the heat exchanger 68, the injector 70 pressurizes the cooled exhaust gas portion 38 and directs or pushes the exhaust gas portion 38 (increasing its pressure and/or velocity) toward the membrane nitrogen generator 40.

As mentioned above, the controller 52 is coupled to and controls the valve 46 (e.g., via actuators as described above) and the membrane nitrogen generator 40. For example, the controller 52, via valve 48 (e.g., via actuators as described above), may control the amount of exhaust gas portion 38 provided to the membrane nitrogen generator 40. In certain embodiments, the controller 52 may be coupled to the heat exchanger 68 (e.g., via actuators coupled to valves, a pump, a source, and/or any other component of the heat exchanger 68) to control the operation of the heat exchanger 68 (e.g., temperatures of components of the heat exchanger 68). In addition, the controller 52 may be coupled to the injector 70 (e.g., via actuators coupled to valves, pumps, or any other component of the injector) to control its operation. The injector 70 may include an eductor-jet pump, a thermocompressor, or any other type of injector 70. For example, the controller 52 may control the injector 70 to regulate the velocity and pressure imparted to the exhaust gas portion 38.

Upon receiving the pressurized exhaust gas portion 38, the membrane nitrogen generator 40 generates nitrogen from the exhaust gas portion 38. From the membrane nitrogen generator 40, as mentioned above, the nitrogen is either immediately diverted for use in applications of the power plant 32 or diverted to the storage tank 50 for later use. As a result, the nitrogen purification system 12 may provide an on-site source (e.g., exhaust gas portion 38 from the exhaust outlet 16 of the gas turbine system 10) of nitrogen for the gas turbine-based power plant 32 (or its components) without having to purchase and/or transport nitrogen from off-site. Thus, the nitrogen purification system 12 may reduce the costs associated with operating the power plant 32.

Figure 5:
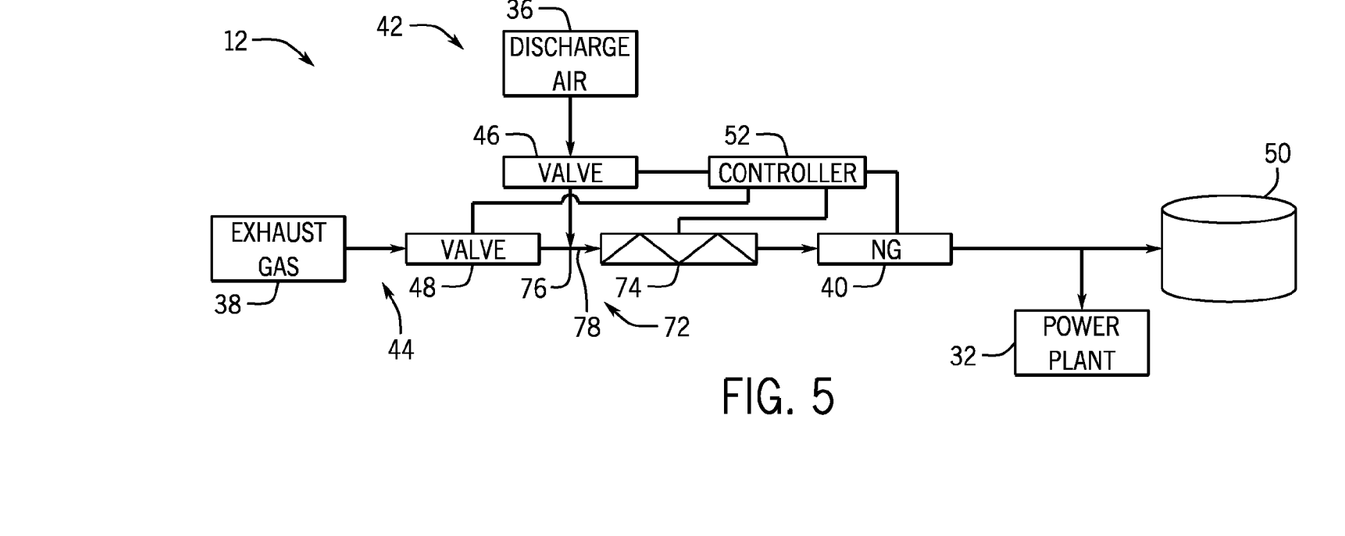
FIG. 5 is a block diagram of an embodiment of the nitrogen purification system of FIG. 1 (e.g., compressor discharge air and gas turbine exhaust gas paths)

FIG. 5 is another block diagram of the nitrogen purification system 12 of FIG. 1 for both the discharge path 42 and the exhaust gas path 44. The discharge air path 42 and the exhaust gas path 44 include the valves 46, 48, respectively. The discharge air path 42 merges with exhaust gas path 44 downstream of valve 48 to form a common path 72 (e.g., discharge air-exhaust gas path). The discharge air-exhaust gas path 72 includes a heat exchanger 74 and the membrane nitrogen generator 40 ("NG"). The valve 46 is disposed along the path 42 downstream of the gas turbine system 10 (e.g., compressor 14) and upstream of the heat exchanger 74. The valve 48 is disposed along the path 44 downstream of the gas turbine system 10 (e.g., exhaust outlet 16) and upstream of the heat exchanger 74. The heat exchanger 74 is disposed along the path 72 downstream of the valves 46, 48 and merging point 76 (e.g., mixing region) of paths 42 and 44. The heat exchanger 74 is also disposed along the path 72 upstream of the membrane nitrogen generator 40.

The exhaust gas portion 38 flows through the valve 48. As mentioned above, the valve 48 may include a non-return valve, one-way valve, or check valve to enable flow of the exhaust gas portion 38 through the valve 48 and towards the heat exchanger 74, while blocking flow of the exchange gas portion 38 back towards the gas turbine system 10 (e.g., exhaust outlet 16). The discharge air portion 36 flows through the valve 46. As mentioned above, the valve 46 may include a non-return valve, one-way valve, or check valve to enable flow of the discharge air portion 36 through the valve 46 and towards the membrane nitrogen generator 40, while blocking flow of the discharge air portion 36 back towards the gas turbine system 10 (e.g., compressor 14). The discharge air portion 36 and the exhaust gas portion 38 mix within the path 72 upstream of the heat exchanger 74 to form a discharge air-exhaust gas mixture 78. The discharge air portion 36 includes sufficient pressure and velocity to push or direct the discharge air-exhaust gas mixture 78 towards the heat exchanger 74. However, in certain embodiments, components such as a blower, compressor, and/or injector as described above in FIGS. 3 and 4 may be used downstream of the merging point 76 to facilitate flow of the discharge air-exhaust gas mixture 78 in the downstream direction along the path 72.

The heat exchanger 74 cools the discharge air-exhaust gas mixture 78 to avoid thermal stress or wear on components of the membrane nitrogen generator 40. For example, the heat exchanger 74 may cool the discharge air-exhaust gas mixture 78 to between approximately 65.6° C. (150° F.) to 148.9° C. (300° F.), 79.4° C. (175° F.) to 135° C. (275° F.), 93.3° C. (200° F.) to 121.1° C. (250° F.), and all subranges therebetween. In certain embodiments, the heat exchanger 74 cools the discharge air-exhaust gas mixture 78 to or less than approximately 148.9° C. (300° F.). The heat exchanger 74 may be as described in FIG. 2. After passing through the heat exchanger 74, the discharge air-exhaust gas mixture 78 flows toward the membrane nitrogen generator 40.

As mentioned above, the controller 52 is coupled to and controls the valves 46, 48 (e.g., via the actuators described above) and the membrane nitrogen generator 40. For example, the controller 52, via valve 46, 48, may control the ratio of the discharge air portion 36 to the exhaust gas portion 38 in the discharge air-exhaust gas mixture 78 provided to the membrane nitrogen generator 40 as described above. In certain embodiments, the controller 52 may be coupled to the heat exchanger 74 (e.g., via actuators coupled to valves, a pump, a source, and/or any other component of the heat exchanger 74) to control the operation of the heat exchanger 74 (e.g., temperatures of components of the heat exchanger 74).

Upon receiving the discharge air-exhaust gas mixture 78, the membrane nitrogen generator 40 generates nitrogen from the mixture 78. From the membrane nitrogen generator 40, as mentioned above, the nitrogen is either immediately diverted for use in applications of the power plant 32 or diverted to the storage tank 50 for later use. As a result, the nitrogen purification system 12 may provide an on-site source (e.g., the discharge air portion 36 and the exhaust gas portion 38 from the compressor 14 and the exhaust outlet 16, respectively, of the gas turbine system 10) of nitrogen for the gas turbine-based power plant 32 (or its components) without having to purchase and/or transport nitrogen from off-site. Thus, the nitrogen purification system 12 may reduce the costs associated with operating the power plant 32.

Figure 6:
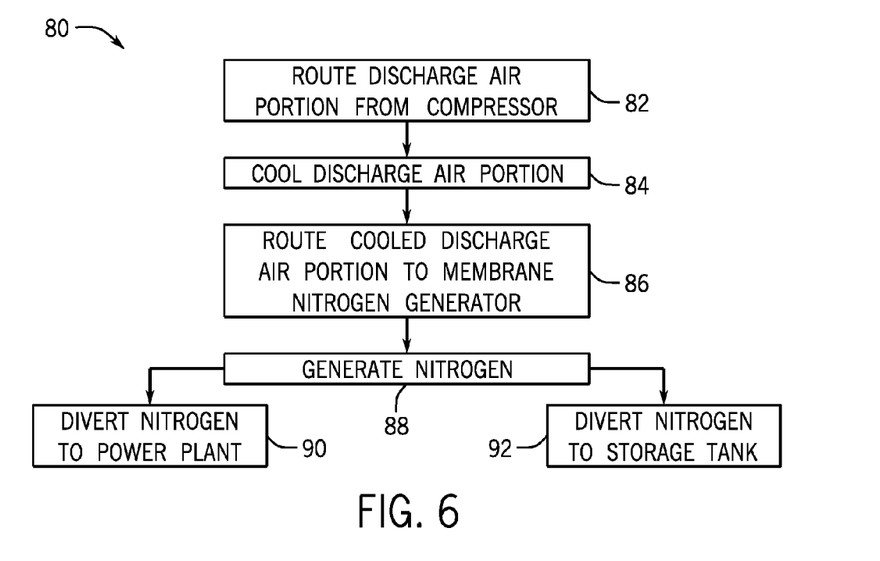
FIG. 6 is an embodiment of a method for generating nitrogen from the gas turbine system and nitrogen purification system of FIG. 1 (e.g., using discharge air)
Figure 7:
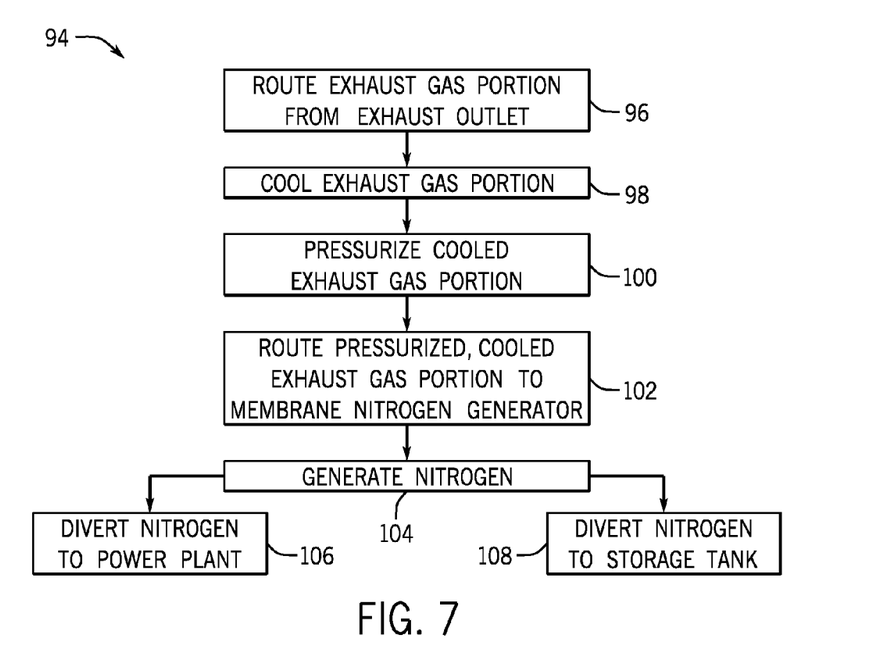
FIG. 7 is an embodiment of a method for generating nitrogen from the gas turbine system and nitrogen purification system of FIG. 1 (e.g., using exhaust gas)
Figure 8:
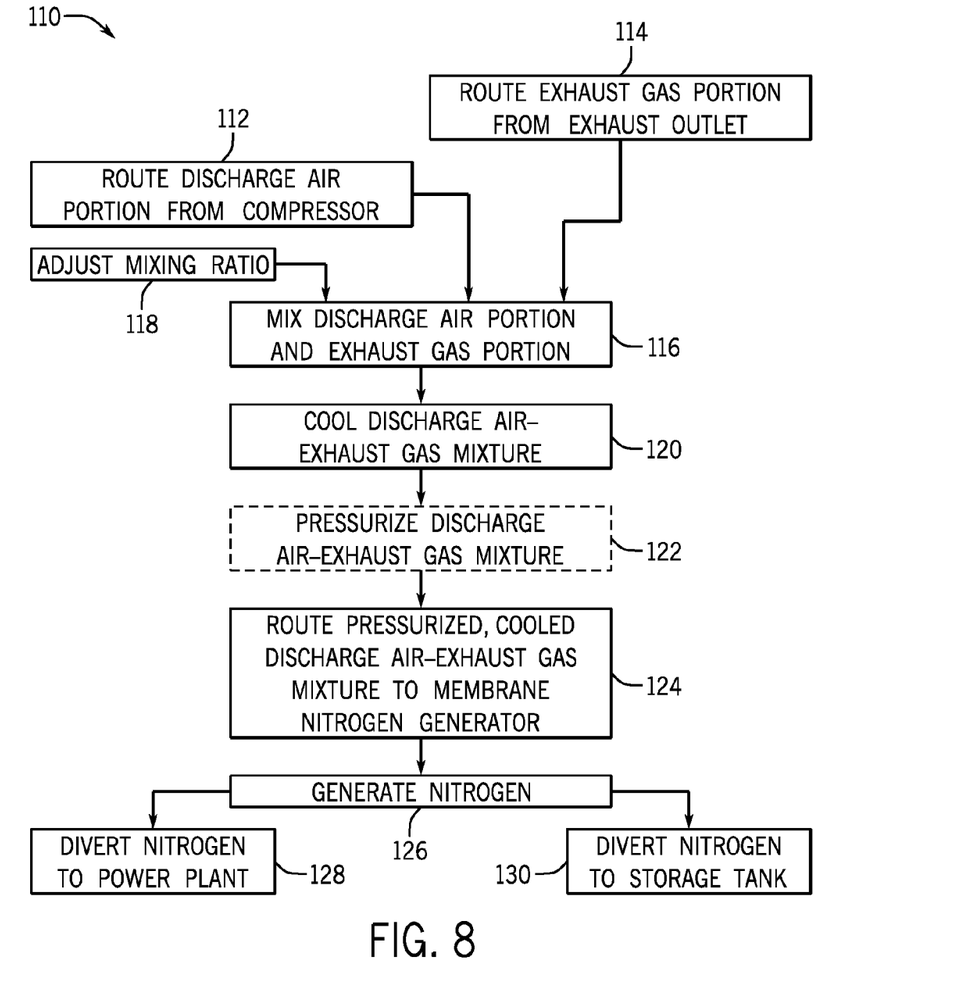
FIG. 8 is an embodiment of a method for generating nitrogen from the gas turbine system and nitrogen purification system of FIG. 1 (e.g., using discharge air and exhaust gas).

FIGS. 6-8 illustrate methods (e.g., computer controlled method using the controller 52) for generating nitrogen from the discharge air portion 36, the exhaust gas portion 38, and/or the discharge air-exhaust gas mixture 78. Each step or some of the steps of each of the methods may include control of components (e.g., membrane nitrogen generator 40, heat exchanger, blower, injector, compressor, etc.) as described above via the controller 52. Also, each step or some of the steps of each of the methods may include computer executable instructions or code.

FIG. 6 is a method 80 for generating nitrogen from the gas turbine system 10 and nitrogen purification system 12 of FIG. 1 using the discharge air portion 36. The method 80 includes routing the discharge air portion 36 from the compressor 14 along the discharge air path 42 (block 82). The method 82 also includes, upstream of the membrane nitrogen generator 40, cooling the discharge air portion 36 via the heat exchanger 60 to generate a cooled discharge air portion 36 (block 84). From the heat exchanger 60, the cooled discharge air portion 36 is routed to the membrane nitrogen generator 86 (block 86). The membrane nitrogen generator 40 generates nitrogen from the cooled discharge air portion 36 as described above (block 88). From the membrane nitrogen generator 40, the nitrogen purification system diverts the nitrogen to the gas turbine-based power plant 32 for immediate use in power plant applications (block 90) or diverts the nitrogen to the storage tank 50 for later use (block 92).

FIG. 7 is a method 94 for generating nitrogen from the gas turbine system 10 and nitrogen purification system 12 of FIG. 1 using the exhaust gas portion 38. The method 94 includes routing the exhaust gas portion 38 from the exhaust gas outlet 16 along the exhaust gas path 44 (block 96). Routing the exhaust gas portion 38 may include utilizing the blower 62 to direct or push the exhaust gas portion 38 (increasing its velocity) toward and through the heat exchanger 64. The method 94 also includes, upstream of the membrane nitrogen generator 40, cooling the exhaust gas portion 38 via the heat exchanger 64 to generate a cooled exhaust gas portion 38 (block 98). From the heat exchanger 64, the cooled exhaust gas portion 38 flows along the path 44 to the compressor 66 or the injector 70, where the compressor 66 or the injector 70 pressurizes the cooled exhaust gas portion 38 (block 100) and routes (e.g., directs or pushes) the pressurized, cooled exhaust gas portion 38 towards the membrane nitrogen generator 40 (block 102). The membrane nitrogen generator 40 generates nitrogen from the pressurized, cooled exhaust gas portion 38 as described above (block 104). From the membrane nitrogen generator 40, the nitrogen purification system diverts the nitrogen to the gas turbine-based power plant 32 for immediate use in power plant applications (block 106) or diverts the nitrogen to the storage tank 50 for later use (block 108).

FIG. 8 is a method 110 for generating nitrogen from the gas turbine system 10 and nitrogen purification system 12 of FIG. 1 using the discharge air-exhaust gas mixture 78. The method 110 includes routing the discharge air portion 36 from the compressor 14 along the discharge air path 42 (block 112). The method 110 also includes routing the exhaust gas portion 38 from the exhaust gas outlet 16 along the exhaust gas path 44 (block 114). The paths 42 and 44 intersect to form the common path 72 (e.g., discharge air-exhaust gas path), where the discharge air portion 36 and the exhaust gas portion 38 mix to form the discharge air-exhaust gas mixture 78 (block 116). As described above, the controller 52 may control the amount of both the discharge air portion 36 and the exhaust gas portion 38 routed from the compressor 14 and the exhaust outlet 16, respectively. In certain embodiments, the method 110 includes adjusting the ratio, via the controller 52, of the discharge air portion 36 mixed with the exhaust gas portion 38 (block 118). The discharge air portion 36 may provide a sufficient pressure and/or velocity to enable flow of the discharge air-exhaust gas mixture 78 along the path 72. Alternatively, in certain embodiments, the blower 62 described above may be utilized to direct or push the discharge air-exhaust gas mixture 78 (increasing its velocity) along the path 72 toward the heat exchanger 74. The method 110 also includes, upstream of the membrane nitrogen generator 40, cooling the discharge air-exhaust gas mixture 78 via the heat exchanger 74 to generate a cooled discharge air-exhaust gas mixture 78 (block 120). From the heat exchanger 74, in certain embodiments, the cooled discharge air-exhaust gas mixture 78 flows along the path 72 to the compressor 66 or the injector 70, where the compressor 66 or the injector 70 pressurizes the cooled discharge air-exhaust gas mixture 78 (block 122). Either from the heat exchanger 74, the compressor 66, or the injector 70, the method 110 includes routing the pressurized, cooled discharge air-exhaust gas mixture 78 towards the membrane nitrogen generator 40 (block 124). The membrane nitrogen generator 40 generates nitrogen from the pressurized, cooled discharge air-exhaust gas mixture 78 as described above (block 124). From the membrane nitrogen generator 40, the nitrogen purification system diverts the nitrogen to the gas turbine-based power plant 32 for immediate use in power plant applications (block 128) or diverts the nitrogen to the storage tank 50 for later use (block 130).

Technical effects of the disclosed embodiments include providing systems and methods for generating nitrogen from the gas turbine system 10 (e.g., gas turbine engine) utilizing the nitrogen purification system 12 coupled to the gas turbine system 10. The discharge air portion 36 routed from the compressor 14, the exhaust gas portion 38 routed from the exhaust outlet 16, or the discharge air-exhaust gas mixture 78 may be utilized as a source for the nitrogen purification system 12 to generate nitrogen. The nitrogen purification system 12 includes the membrane nitrogen generator 40 to generate the nitrogen from the sources provided from the gas turbine system 10. The nitrogen purification system 12 may divert the generated nitrogen to the gas turbine-based power plant 32 for present use or to the storage tank 50 for future use in the power plant 32 during a gas turbine system shutdown. By using the discharge air portion 36 and/or exhaust gas portion 38 as the source (a source that normally would otherwise be wasted) for nitrogen (e.g., via the nitrogen purification system), the gas turbine-based power plant 32 is able in a cost effective manner to generate nitrogen on-site without having to purchase and/or provide nitrogen from off-site.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a nitrogen purification system configured to couple to a gas turbine, wherein the nitrogen purification system is configured to mix a portion of a discharge air from a compressor of the gas turbine and a portion of an exhaust gas from an exhaust outlet of the gas turbine upstream of a membrane nitrogen generator to generate a discharge air-exhaust gas mixture, and wherein:
the membrane nitrogen generator is configured to receive the discharge air-exhaust gas mixture, and the membrane nitrogen generator is configured to generate nitrogen from the discharge air-exhaust gas mixture.

2. The system of claim 1, wherein the nitrogen purification system comprises a controller configured to adjust a ratio of the portion of the discharge air relative to the portion of the exhaust gas provided to the membrane nitrogen generator.

3. The system of claim 1, wherein the nitrogen purification system comprises a heat exchanger located upstream of the membrane nitrogen generator, wherein the heat exchanger is configured to cool the discharge air-exhaust gas mixture.

4. The system of claim 3, wherein the nitrogen purification system comprises a valve located downstream of the exhaust outlet and upstream of the heat exchanger, wherein the valve is configured to enable flow of the portion of the exhaust gas through the valve to mix with the portion of the discharge air upstream of the heat exchanger and to block flow of the portion of the exhaust gas through the valve to the exhaust outlet.

5. A method for generating nitrogen from a gas turbine, comprising:
routing a portion of a discharge air from a compressor of the gas turbine;
routing a portion of an exhaust gas from an exhaust outlet of the gas turbine;
mixing the portion of the discharge air and the portion of the exhaust gas upstream of a membrane nitrogen generator to generate a discharge air-exhaust gas mixture;
routing the discharge air-exhaust gas mixture to the membrane nitrogen generator; and
generating nitrogen, via the membrane nitrogen generator, from the discharge air-exhaust gas mixture.

6. The method of claim 5, comprising:
adjusting a ratio of the portion of the discharge air relative to the portion of the exhaust gas to generate the discharge air-exhaust gas mixture.

7. The method of claim 5, comprising:
cooling, via a heat exchanger, the discharge air-exhaust gas mixture upstream of the membrane nitrogen generator.

* * * * *